UNITED STATES PATENT OFFICE.

NATHAN SULZBERGER, OF BERLIN, GERMANY.

PROCESS OF MAKING AZO DYES CONTAINING RADICALS OF HIGHER FATTY ACIDS.

No. 879,424.  Specification of Letters Patent.  Patented Feb. 18, 1908.

Application filed March 26, 1907. Serial No. 364,737.

*To all whom it may concern:*

Be it known that I, NATHAN SULZBERGER, a citizen of the United States, residing at Oberwasserstrasse 12. II, Berlin, Germany, have invented new and useful Improvements in Processes for the Production of Azo Dyestuffs Containing the Radicals of Higher Fatty Acids, of which the following is a specification.

The present invention relates to the production of azo colors containing the radical of the fatty acids, which occur in natural fats. The aryl derivatives of these fatty acids can be converted into the amido-compounds by nitration followed by reduction, while the fatty acid radical remains in the compound. These amido compounds can be diazotized and then coupled with aromatic amins or phenols. It has now been shown, that the azo compounds thus obtained, which still contain the fatty acid radical, are distinguished from the other azo colors especially by their fatty nature, which enables them to be utilized with advantage for different purposes in which the azo colors hitherto have not been suitable or have given poor results.

Any amido fatty acid anilid or naphthalid is suitable for the production of the new azo colors. Substituted amins can also be employed. The fatty acids which can be used are those of fats, such as stearic acid, palmitic acid, oleic acid, erucic acid, brassidic acid, ricinoleic acid, oxystearic acid and the like.

The fatty acid anilids are nitrated by the usual methods for example advantageously with a mixture of nitric and sulfuric acids, afterwards reduced with metals and acids, for example zinc or iron and hydrochloric acid, acetic acid or the like, and finally diazotized in the usual way, for example dissolved in glacial acetic or other suitable solvent and treated with nitrous acid or nitrite. The diazo salts thus obtained are introduced into a solution of phenols, for example, an alkaline solution of phenol, resorcinol, or naphthol or the derivative of a phenol, or naphthol, or into the solution of an amin, advantageously in acetic acid, (for example naphthylamin, dimethylanilin, phenylenediamin etc.) or the derivative of an amin. The reaction takes place almost instantaneously. The dye-stuff separates out in solid form, or is precipitated by the addition of common salt. It is filtered, washed, and if desired, recrystallized.

*Examples.*

1. *Production of beta naphthol-azo-stearic-acid-anilid.* 10 grams of the anilid of stearic acid are dissolved in 70–80 grams of concentrated sulfuric acid at a moderate temperature (50° C.). To this solution is added about 7 grams of dilute nitric acid of specific gravity 1.17, the temperature being maintained at best between 50–60° C. The nitric acid can be added as rapidly as the temperature will allow, and it is best to cool well so that the nitric acid can be run in as quickly as possible. However, should the temperature sink too low, then the anilid readily separates out unchanged, and one runs the risk of some of it escaping nitration. After the addition of all the nitric acid the mixture is poured—still at 60–70° C.—into much cold water and vigorously stirred; the yellow nitro compound is filtered off and washed. The p-nitro-stearic-acid-anilid thus obtained is quite pure after only one recrystallization from alcohol (with the addition of animal charcoal if necessary), and it is obtained in the form of small, lemon-yellow, felted needles, which melt between 94.5° and 95.5° C. With caustic alkalies, they become intense yellow-red even in the cold. This substance (5 grams) is now dissolved in alcohol (about 100 grams), mixed with about 5 grams glacial acetic acid, and iron filings (about 5 grams) are added at about 60° C. during which care must be taken that the metal is introduced in small quantities with constant stirring after each fresh addition. Care should be taken, especially when large quantities are being worked up, that the reaction does not suddenly become too violent on account of the iron filings being added too quickly to the acid solution. The hot solution is filtered from the iron, precipitated with water, and the amido compound, colored brownish red by the iron salts which were dissolved in the alcohol is filtered off. The amido compound recrystallized from alcohol with the addition of some animal charcoal is a colorless substance, which melts at 117.5 to 118.5° C., and gives no colorations with alkalies in the cold. One can also replace the alcohol by any otherwise suitable solvent, or the material can be reduced as a precipitate in some suitable medium such as acetic acid.

The para-amido-stearic-acid-anilid forms, in the pure condition, a white crystalline body, consisting of felted needles, which in contrast to the nitro compound does not give a coloration with caustic potash. It has a fatty feel and after previously sintering at 115-116° melts at 118-119°, forming an almost colorless liquid.

The analysis agrees with the formula

| | Found. | Theory. |
|---|---|---|
| C | 76.84% | 77.01% |
| H | 11.17% | 11.23% |

The amido-stearic-anilid is insoluble in ether, petroleum-ether and water; readily soluble in alcohol and chloroform.

The p-amido-stearic-acid-anilid is dissolved in alcohol or the like, or is suspended in some liquid. The liquid in which the anilid is suspended or dissolved, is acidified with gaseous or aqueous hydrochloric acid at a low temperature for instance 0° C. and then treated with gaseous nitrous acid, or a nitrite, until diazotization is complete. The diazo salt produced can then be brought into solution by gently warming—if necessary with the addition of alcohol, should too much aqueous hydrochloric acid have been taken. (This can be done without decomposing the diazo compound, because the latter is unusually stable.) One can now pour the strongly acid solution or liquid with precipitate in suspension straight into the aqueous, alkaline solution of the naphthol, which must contain so much alkali that the solution reacts alkaline even after the addition of the strongly acid diazo solution. It is better however, to pour the alcoholic solution of the diazo salt into much cold water (if necessary on to ice) when the diazo compound separates out as a colorless, solid mass. In the latter case the diazo salt is filtered off, and is, if necessary dissolved in warm alcohol, or in the solid form as a precipitate suspended in water, added to the slightly warmed alkaline, preferably very dilute solution of the naphthol (somewhat more than 1 molecule). The azo dyestuff, which separates out almost immediately is of a cinnabar color. It is filtered off well washed and after drying is available for use. The substance can be recrystallized from chloroform for instance—being soluble in the solvents for fats. The melting point lies at about 150°.

Various shades are obtained according to the phenol (naphthol) or amin which is used in the coupling with the diazostearic anilid, for example with

| | |
|---|---|
| Beta naphthol | intense red |
| Beta naphthylamin | orange red |
| Resorcin | brown red |
| Dimethylanilin | greenish yellow |
| R-salt | raspberry red |
| Alpha naphthol | carmine red |
| Alpha naphthylamin | dark brown |
| Phenol | yellow |

2. *Preparation of dye-stuff, starting from the beta naphthylamid of palmitic acid.* 20 grams palmitic acid and 13.5 grams naphthylamin are heated in an oil-bath to 260° C. for 1½ hours. Towards the close the temperature is raised to 300° C. so that the excess of naphthylamin to a great extent is sublimed off. The mass is often shaken during the heating. The raw product, while yet fluid, is poured into 200 grams glacial acetic acid and into the clear solution thus obtained, warmed to 65° C., are poured all at once 10 grams nitric acid, sp. gr. 1.4. The nitration ensues immediately without any noticeable increase in temperature. After cooling, the product is poured into cold water, which causes a yellow crystalline body to separate out. The latter is filtered off, washed and dissolved in alcohol. The alcoholic solution is mixed with about ⅓ of its volume of glacial acetic acid; and then treated at 60° C., with small quantities of iron filings, well stirred into the mixture, until the yellow nitro compound is completely reduced and a small sample, filtered off, gives a pure white precipitate on the addition of water and hydrochloric acid. After standing a short time, with frequent stirring, the still warm solution is filtered from the iron, and the filtrate, when cold, poured into cold water. The almost colorless amido compound is filtered off and the iron salts washed out as completely as possible. The pure amido compound forms a white, colorless crystalline powder, having a fatty feel. The body is insoluble even in boiling water, and does not melt under these conditions. It is readily soluble in alcohol, benzene and chloroform, and difficultly in ether and petroleum-ether. The amido-body is dissolved in alcohol, strongly acidified with concentrated hydrochloric acid, and the partly dissolved, partly suspended body diazotized at 0° with gaseous, nitrous acid. After complete diazotization cold water is added; the greenish-yellow product is filtered off and washed. The product, finely suspended in water, can now be used for coupling. The following colors were obtained, with β naphthol _____ carmine
β naphthylamin _____ brown
Phenol _____ yellowish-brown
Dimethylanilin _____ brownish-yellow The dyestuffs have a pronounced fatty character, give for example grease-spots and prevent the wetting of the dyed material. They float on water like the fats.

*3. Preparation of dye-stuffs from oleic acid.* 50 grams of oleic acid are heated in a reflux apparatus with 40 grams of anilin for 9 hours, the oil-bath being maintained at 240–260° C. Finally the excess of anilin is distilled off at about 300° C. The oleic-acid-anilid is cautiously dissolved in about 900 grams concentrated sulfuric acid, to which is slowly added at 5° C., 50 grams nitric acid (sp. gr. 1.17) with constant stirring. On carefully pouring into ice-water, the yellow nitro compound separates out. This is filtered off, washed and dissolved in alcohol. The solution is mixed with aqueous concentrated hydrochloric acid, and treated gradually at 60° C. with small portions of iron powder with constant stirring until reduction is complete, and a small sample of the solution gives a pure white flocky precipitate of the amido compound on the addition of water. The amido compound is much more soluble than the nitro-body, especially in alcohol containing acid. The excess of iron is filtered off, and the filtered solution poured, when cold, into much cold water. The body separates out in colorless flocks, which are filtered off and washed. The diazotization is carried out as described under amido-stearic-anilid. The couplings gave the following colorations:

Phenol _____ orange
α naphthol _____ Bordeaux red
β naphthol _____ intense red
α Naphthylamin (in strong acetic acid) ____ violet
β naphthylamin _____ orange
Dimethylanilin _____ reddish-yellow
R-salt _____ bright red
Resorcin _____ dark brown

*4. Preparation of dye-stuffs starting from palmitic-acid-anilid.*—50 grams of palmitic acid are boiled for 6–7 hours at 240–260° C. with 40 grams of anilin. The excess of anilin is distilled off, the residue dissolved in 800–900 grams concentrated sulfuric acid and nitrated at 40° with 50 grams nitric acid (sp. gr. 1·17). The product is poured into water and the precipitate filtered off and washed. The nitro compound, dissolved in alcohol, is now reduced at 60–70° with alcoholic hydrochloric acid and iron powder. The solution is filtered from the excess of iron, and poured into much cold water, which causes the pure, white amido compound to be thrown out of solution. The amido body, after being filtered and washed, is dissolved in alcohol and precipitated with aqueous concentrated hydrochloric acid and diazotized at ordinary temperature. The solution thus obtained is filtered from a little oily by-product which often forms, and then poured into cold water. The diazo compound thus obtained is finely suspended in water and finally coupled with the phenols and amins. The following colorations were obtained:

Alpha naphthol _____ carmine red
Beta naphthol _____ intense red
Alpha naphthylamin ____ brownish-red
Beta naphthylamin _____ yellowish-brown
Dimethylanilin _____ yellow
Resorcin _____ dark-brown Instead of the pure acids and amins etc. mixtures of the different fatty acids and amins can be used.

The compounds thus obtained are characterized by being on the one hand real dye-stuffs, but on the other hand they have also a fatty nature, in consequence of which they behave like fats; they can therefore be mixed, and dissolved in the latter, and also in the usual solvents for fats such as wax, fats, paraffins etc. These bodies can consequently be employed in all those cases, where a color, soluble in fats, is desired. These colors for example therefore can be used as cosmetic paints, either in substance or dissolved in fats etc. In this particular application, these bodies in consequence of their fatty properties possess the particular advantage of readily forming emulsions with soaps, and the like, and are thus easily removed again from the skin. Again they can likewise be used as pigments and artists' colors, dissolved for example in turpentine or some other suitable vehicle. Formerly where such properties were desired, only a limited number of dyes and colors could be used, and it was necessary to employ, in most cases, mere mechanical mixtures of colors with waxes and other vehicles; a method which possessed the disadvantage that the mixing was often imperfect, and the mixture was of a more or less unstable nature. As moreover these new compounds generally melt without decomposition, the higher melting ones can be melted and cast into sticks, in which form they can also be conveniently brought on to the market. These new bodies, in addition, are very stable towards acids and alkalies and can consequently be brought into contact with acids and alkalies without fearing chemical changes; a property which would enable these dyestuffs to be used in the manufacture of colored soaps and the like. As these bodies are also without smell and taste they can also be used with advantage in all such cases, where these properties are valuable and desirable. Another advantage of these bodies is that they do not decompose on keeping, or become rancid, although they are completely fatty in character. In consequence of the high melting points of a large number of these dyestuffs, they do not depress the melting point of stearin, tallow, etc. and hence these compounds are suitable for coloring candles. Wool, silk and cotton can also be dyed, best with solutions of these fatty colors for instance in alcohol, and are then more or less water-proof in consequence of the fatty nature of these dyestuffs.

What I claim as my invention and desire by Letters Patent is:

A process for the production of azo dyestuffs, containing the radical of a fatty acid occurring in fats, consisting in coupling the diazo compounds of the amido-fatty acid-arylids with amins and phenols, substantially as and for the purpose set forth.

12th day of March, 1907.

NATHAN SULZBERGER.

Witnesses:
 HAROLD BARON,
 FRANCIS WILLIAM KAY.